United States Patent [19]

D'Silva

[11] 4,182,628

[45] Jan. 8, 1980

[54] PARTIALLY AMORPHOUS SILVER-COPPER-INDIUM BRAZING FOIL

[75] Inventor: Thomas L. D'Silva, Belmont, Calif.

[73] Assignee: GTE Sylvania Products, Inc., Stamford, Conn.

[21] Appl. No.: 921,425

[22] Filed: Jul. 3, 1978

[51] Int. Cl.² ............................ C22C 9/00; C22C 5/06
[52] U.S. Cl. .................................. 75/153; 75/173 C; 428/673
[58] Field of Search ................ 75/173 C, 153, 176; 428/673

[56] References Cited

U.S. PATENT DOCUMENTS

| 2,970,248 | 1/1961 | Sahagun | 75/173 C |
| 3,373,016 | 3/1968 | Roeder et al. | 75/173 C |
| 3,427,154 | 2/1969 | Mader et al. | 75/173 C |
| 3,940,293 | 2/1976 | Polk et al. | 75/176 |
| 4,053,728 | 10/1977 | Talento et al. | 75/173 C |

FOREIGN PATENT DOCUMENTS 1036245 of 1966 United Kingdom .................. 75/173 C

*Primary Examiner*—L. Dewayne Rutledge
*Assistant Examiner*—Peter K. Skiff
*Attorney, Agent, or Firm*—Donald R. Castle

[57] ABSTRACT

Alloys of the atomic composition, $Ag_{(25-66)}$ $Cu_{(16-68)}$ $In_{(7-18)}$ in the form of thin foil, are made ductile by the presence of appreciable amounts of amorphous phase and a metastable, micro-crystalline, solid solution, single phase and are especially suited for fabricating preforms for preplacement in a joint to be joined by an operation such as brazing.

3 Claims, No Drawings

PARTIALLY AMORPHOUS SILVER-COPPER-INDIUM BRAZING FOIL

BACKGROUND OF THE INVENTION

1. Field of the Invention

This invention relates to silver-copper-indium brazing alloys. More particularly it relates to silver-copper-indium brazing alloys in the form of a ductile thin brazing foil that can contain up to about 18 atomic percent of indium.

2. Prior Art

Alloys in the system Ag-Cu-In are used for vacuum tube brazing where high vapor pressure elements cannot be tolerated. The Ag-Cu-In alloys used currently are restricted to a maximum indium content of 15 weight percent. Above about 12 weight percent of indium, the alloys are difficult to fabricate by conventional casting and rolling technique. Therefore, the use of Ag-Cu-In alloys for brazing foil produced by prior methods is limited to alloys containing a maximum of about 12 percent by weight.

An alloy with 15 percent by weight In and a Ag-Cu eutectic ratio has a liquidus temperature of 705° C. and a melting range of 75° C. This wide melting range causes the alloy to liquate during the brazing cycle. Also the 15 percent by weight In, Ag-Cu eutectic ratio composition is the lowest melting of all the Ag base low vapor pressure brazing alloys available as foil, and there is a need for brazing alloys with a lower liquidus temperature.

U.S. Pat. No. 3,856,513 discloses a wire product where alloys are represented by the formula $T_i X_j$ wherein T is a transition metal or mixture thereof and X is Al, Sb, Be, B, Ge, C, In, P, Si or Sn or mixtures thereof. The transition metals include metals from Groups IB, IIIB, IVB, VB, VIB, VIIB and VIIIB of the periodic table, i is from about 70 to about 87 and j is from about 13 to about 30 atomic percent. The patent also teaches that the alloys contain at least 50 percent amorphous phase. As is apparent from that description, 280 binary alloys and an infinite number of tertiary, quaternary, etc. alloys are disclosed. Specific examples are given to a $Pd_{77.5} Cu_6 Si_{16.5}$ alloy and a $Ni_{40} Pd_{40} P_{20}$ alloy. The patent also discloses ternary alloys of the formula $M_a Y_b Z_c$ in sheet, ribbon and powder form wherein M is Fe, Ni, Cr, Co or V, Y is P, C or B and Z is Al, Si, Sn, Sb, Ge, In or Be.

As can be appreciated, the disclosure of the foregoing patent does not teach the alloys of this invention nor does it indicate that any advantages occur in a silver-copper-indium system. Furthermore, it teaches that in order to be ductile the alloy must contain at least 50 percent amorphous phase.

It is believed, therefore, that a silver-copper-indium alloy in the form of a thin brazing foil that can contain up to 18 atomic percent of indium is an advancement in the art.

SUMMARY OF THE INVENTION

Brazing sheets having a thickness of from about 0.0005 to about 0.005 inches and having a composition expressed by the formula $Ag_x Cu_y In_z$, wherein x is from abuot 25 to about 66 atomic percent, y is from about 16 to about 68 atomic percent and z is from about 7 to about 18 atomic percent, and containing appreciable amounts of an amorphous phase and a metastable, micro-crystalline, solid solution, single phase are ductile and are suitable for fabricating brazing preforms.

DETAILS OF PREFERRED EMBODIMENTS

For a better understanding of the present invention, together with other and further objects, advantages and capabilities thereof, reference is made to the following disclosure and appended claims in connection with the above description of some aspects of the invention.

A silver base brazing alloy of an indium content higher than 15 percent by weight, is provided by this invention in the form of thin foils which are ductile and therefore suitable for fabricating into brazing preforms. The higher indium content provides an alloy having a lower liquidus temperature and a lower melting range than was heretofor available in brazing foils in the silver-copper-indium system.

The Ag-Cu-In ternary phase diagram is described in "A Bibliography of Indium," the Indium corporation of America pgs. 103-105. This reference also shows pseudobinary cross sections at 10 percent by weight In and 20 percent by weight In. The minimum melting composition at 10 percent by weight In corresponds to a Ag:Cu ratio of 62 to 28, with a liquidus temperature of 720° C. and a melting range of 120°C. At 20 weight percent of In, the minimum melting composition has a liquidus temperature of 650° C. and a melting range of 50° C. Therefore, with increasing indium content, the liquidus temperature and the melting range both decrease and this is highly desirable for a brazing alloy. The indium content is currently restricted to a maximum of 15 percent by weight beyond which it is extremely difficult to make thin foil by conventional processing techniques. Between 15 percent by weight and 20 percent by weight In, the alloy has substantial toughness so as not to embrittle the brazed joint whereas above 20 weight percent of In the brazed joint would be too brittle.

It has been known that rapid cooling or quenching of a molten metal produces amorphous phases rather than crystalline phases. Some techniques for producing rapidly quenched foil have been disclosed in U.S. Pat. Nos. 3,896,203; 3,863,700; 3,881,548 and 3,881,541 incorporated by reference herein, however, the preferred process for producing the alloys of this invention is impinge a metal stream flowing from an orifice upon a rotating drum having a coolant inside the drum. The molten metal solidifies upon the drum and then is removed from the drum in the form of a metal strip of sheet. As can be appreciated, production of metal foils by this method is more economical than conventional casting and rolling techniques.

Depending on the cooling rate during the rapid quenching, of the alloys of this invention the resulting structure consists of a combination of an amorphous phase, new phases not available under equilibrium conditions and solid solution with solubility limits extended beyond their equilibrium values, as described by Pol Duwez, R. H. Willens in Transactions of the Metallurgical Society of AIME, Vol. 227, p. 362, April 1963. The amorphous phase is intrinsically ductile because the glassy structure allows for slip in all possible directions. Additional ductility results from the presence of a metastable micro-crystalline, single phase, solid solution which has a large grain-boundary area. The foil of this invention is made ductile by the presence of appreciable amounts of an amorphous phase and a metastable microcrystalline solid solution single phase generated by a rapid cooling rate of the order of about $10^5$ °C./sec. to about $10^6$ °C./sec. This high rate of cooling is achieved through a number of available processes such as melt extraction, melt spin, vapor deposition and sputtering.

The major advantages of this invention are with the higher indium content alloys that is in the range of from about 12 to about 20 percent by weight of indium. The higher indium content alloys having a copper content of about 28 to 30 percent by weight and a silver content of from about 50 to about 60 percent by weight are preferred. Brazing foils of this invention containing less than 12 percent by weight of indium are more ductile than the prior art brazing foils having the same indium content and can be fabricated into more intricate shapes than the prior art brazing foils.

While there have been described what at present are considered to be the preferred embodiments of this invention, it will be obvious to those skilled in the art that various changes and modifications may be made therein without departing from the scope of the invention as defined by the appended claims.

What is claimed is:

1. A ductile thin brazing foil consisting essentially of a composition consisting essentially of an alloy of the formula $Ag_x Cu_y In_z$ wherein
    x is from about 25 to about 66 atomic percent
    y is from about 16 to about 68 atomic percent
    z is from about 7 to about 18 atomic percent and containing an amorphous phase and a metastable, microcrystalline, solid solution single phase and having a thickness of from about 0.0005 to about 0.005 inches.

2. A sheet according to claim 1 wherein said indium content in said alloy is from about 12 to about 20 percent by weight.

3. A sheet according to claim 2 wherein said alloy has a copper content of from about 28 to 30 percent by weight and a silver content of from about 50 to about 60 percent by weight.

* * * * *

UNITED STATES PATENT AND TRADEMARK OFFICE
CERTIFICATE OF CORRECTION

PATENT NO. : 4,182,628
DATED : January 8, 1980
INVENTOR(S) : Thomas L. D'Silva

It is certified that error appears in the above—identified patent and that said Letters Patent are hereby corrected as shown below:

Cover Page, [73] Assignee - Replace "GTE Sylvania Products, Inc. Stamford, Conn." with --- GTE Products Corporation, Stamford, Conn. ---.

*Signed and Sealed this*

*First* Day of *July 1980*

[SEAL]

Attest:

Attesting Officer

SIDNEY A. DIAMOND

*Commissioner of Patents and Trademarks*